United States Patent [19]

Kouchiwa et al.

[11] Patent Number: 4,690,518

[45] Date of Patent: Sep. 1, 1987

[54] WIDE ANGLE COPYING LENS SYSTEM

[75] Inventors: Taira Kouchiwa, Kamakura; Kiichiro Nishina, Tokyo, both of Japan

[73] Assignee: Ricoh Company, Ltd., Tokyo, Japan

[21] Appl. No.: 839,044

[22] Filed: Mar. 12, 1986

[30] Foreign Application Priority Data

Mar. 15, 1985 [JP] Japan .................. 60-50616

[51] Int. Cl.[4] .............................. G02B 9/62
[52] U.S. Cl. ..................... 350/464; 350/450
[58] Field of Search ............. 350/464, 425, 450

[56] References Cited

U.S. PATENT DOCUMENTS

| | | | |
|---|---|---|---|
| 3,088,371 | 5/1963 | Lowenthal | 350/464 |
| 3,370,905 | 2/1968 | Hudson | 350/464 |
| 3,871,749 | 3/1975 | Harada | 350/464 |
| 4,061,419 | 12/1977 | Price et al. | 350/464 X |
| 4,269,477 | 5/1981 | Kitagawa | 350/464 |
| 4,345,823 | 8/1982 | Shinohara | 350/464 |

*Primary Examiner*—John K. Corbin
*Assistant Examiner*—Scott J. Sugarman
*Attorney, Agent, or Firm*—Oblon, Fisher, Spivak, McClelland & Maier

[57] ABSTRACT

This invention relates to a completely symmetrical wide angle copying lens system for a compact copying machine using a high output lamp. A topogon type wide angle lens system which is easy in correction of a radial curvature of field is basically used, and positive meniscus lenses having a small refracting power with a convex surface directed toward a diaphragm are symmetrically arranged with the diaphragm placed therebetween. A copying lens system is provided in which the tangential curvature of field and a deviation of the field cased by color are corrected by the construction as described above, the overall length of the lens system is shortened and even if a copying magnification is changed in the range of from ×0.5 to ×2.0, the performance is not deteriorated.

5 Claims, 37 Drawing Figures

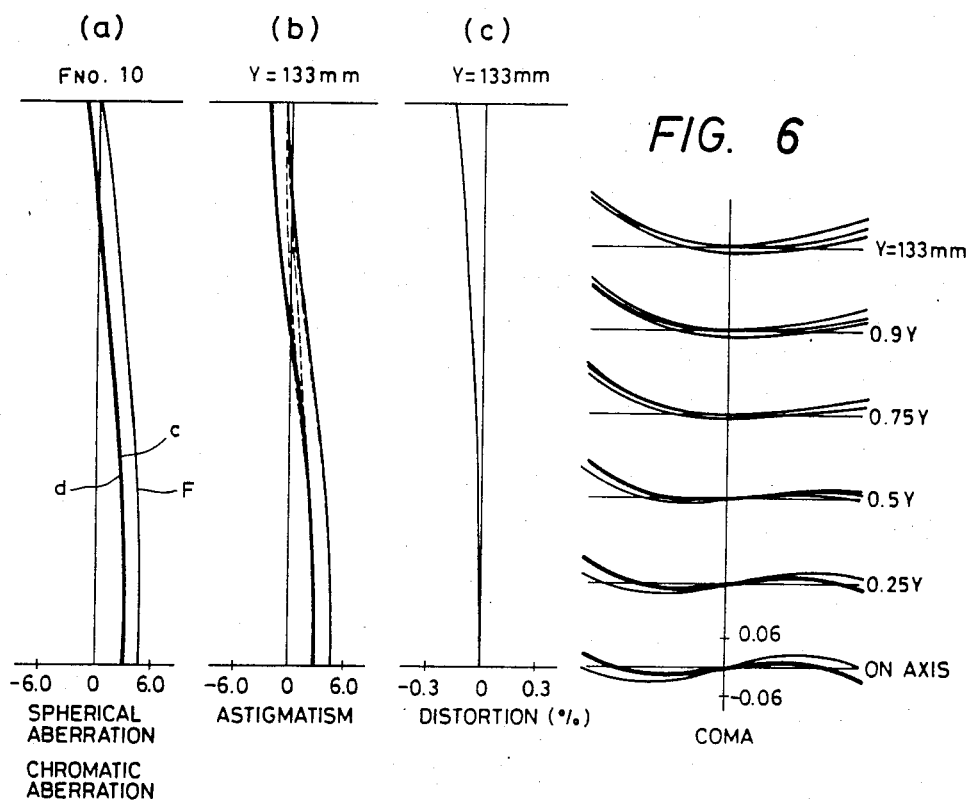

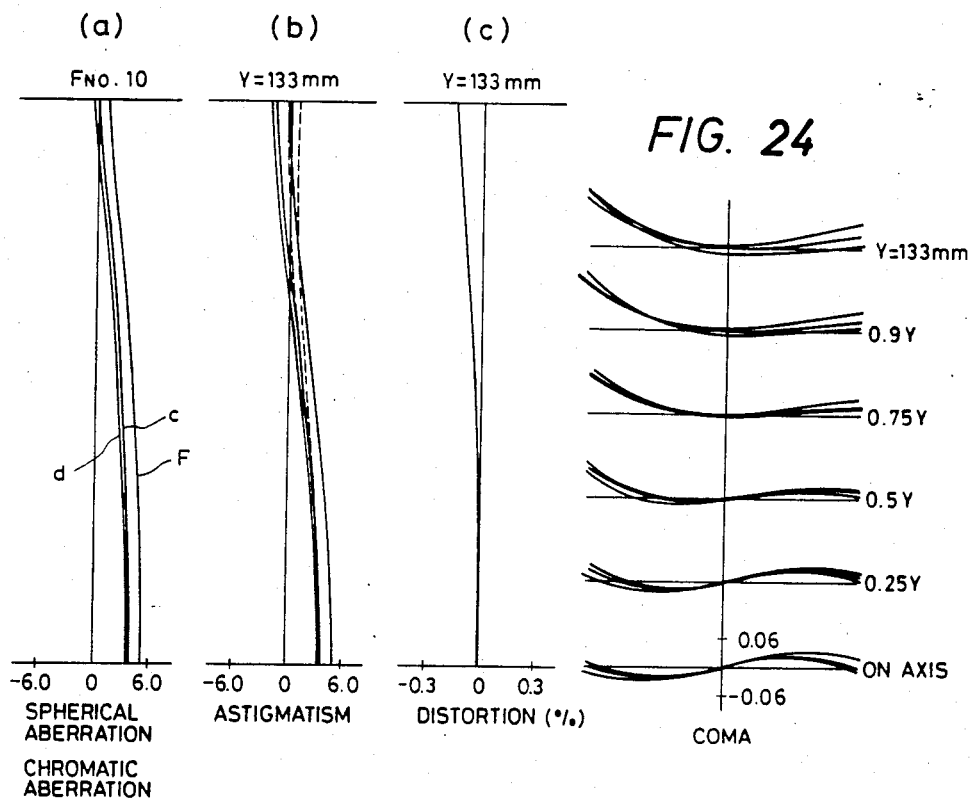

(a) F$_{NO}$ 8 — SPHERICAL ABERRATION / CHROMATIC ABERRATION
(b) Y=115mm — ASTIGMATISM
(c) Y=115mm — DISTORTION (%)

COMA (a) FNO. 8 — SPHERICAL ABERRATION / CHROMATIC ABERRATION
(b) Y=115mm — ASTIGMATISM
(c) Y=115mm — DISTORTION (%)

COMA

WIDE ANGLE COPYING LENS SYSTEM

BACKGROUND OF THE INVENTION

1. Field of the Invention

This invention relates to a copying lens system, and more particularly to a wide angle copying lens system having a completely symmetrical arrangement about a diaphragm.

2. Description of the Prior Art

With the recent trend of miniaturization, higher speed, higher quality of picture and multifunction of copying machines, new requirements have been also added to the copying lens system.

To attain the miniaturization, it is necessary to make an optical system small. In order to make the optical system small, a lens system having a shorter focal length is required but when the focal length is made to be shorter with respect to the originals of the same size, a half field angle increases and the outer diameter of the lenses tends to increase. Conversely, when the overall length of the lens system is shortened, the outer diameter of the lenses can be decreased. That is, a lens system of a wide field angle and a short overall length becomes required.

For high speed copying, a bright lens system is required but when the lens system is made to be bright, the outer diameter of the lenses increases, which is contrary to the miniaturization of the lens system. However, recent development of a photosensitive material having high sensitivity has made it possible to use a lens system having a relatively large F number. In addition, such a lens system is often used with the usage of a high output lamp such as a xenon lamp.

The higher quality of picture is affected by the image forming performance of the lens system, developing performance of the machine and the like. Recently, there are problems in that the number of uses of copying from copied originals increases and various kinds of originals such as prints, hand-written originals and photographs, etc. are used.

As for the multifunction, it is a recent trend to employ a zoom system which can reproduce any size of copies. The lens system for such copying machines has to provide for the same level of image forming performance of unit-magnification at the time of enlargement and reduction.

In the past, the copying lens system having a completely symmetrical arrangement with respect o a diaphragm is often used. As one example, Japanese Patent Publication No. 10,091/76 discloses a lens system comprising six units in the form of six lenses, which has a good image forming performance. This lens system is bright but the image surface cannot be flatened as far as the vicinity of 30° of half field angle, thus making it impossible to provide a wide field angle. In addition, the performance of this lens system is considerably deteriorated at the time of variation of the magnification, and cannot adapt to the variation of magnification from ×0.5 to ×2.0 including unit-magnification.

As a wide field angle lens system, there is one which is of a topogon type and has 34° of half field angle, as disclosed in Japanese Patent Publication No. 29,410/68. In the lens system of this type, a radial curvature of field is easily corrected up to a wide angle but a difference of tangential image surface caused by color occurs as the field angle becomes wide and therefore, correction of aberrations in a wide range of wavelength becomes difficult and the lens system cannot be used in the whole visible range of wavelength. Furthermore, to attain the wide field angle, an air space between the second lens and the third lens has to be increased, thus posing a disadvantage in that the overall length of the lens is extended.

SUMMARY OF THE INVENTION

It is an object of this invention to provide a compact wide angle lens system which makes the best use of advantages of the topogon type, which is easy in correction of a radial curvature of field to facilitate chromatic correction of a tangential image surface, and which is usable up to about 30° of half field angle and does not bring forth a deterioration in performance resulting from the variation of magnification.

In accordance with the present invention, there is provided a wide angle copying lens system comprising a completely symmetrical arrangement of six units in the form of six lenses which consists of, in order from the object field side, a first lens in the form of a positive meniscus with the convex surface directed toward the object field, a second lens in the form of a negative meniscus with the convex surface directed toward the object field, a third lens in the form of a positive meniscus with the concave surface directed toward the object field, a diaphragm, a fourth lens in the form of a positive meniscus with the concave surface, directed toward the image field and of the same configuration as that of the third lens with the diaphragm placed therebetween, a fifth lens in the form of a negative meniscus with the convex surface directed toward the image field and of the same configuration as that of the second lens, and, a sixth lens in the form of a positive meniscus with the convex surface directed toward the image field and of the same configuration as that of the first lens, as shown in a sectional view of FIG. 1, the lens system satisfying the following conditions:

$$2.4 < f_{1,2}/f_1 < 2.8 \tag{1}$$

$$0.065 < \frac{d_1 + d_2 + d_3}{f} < 0.075 \tag{2}$$

$$11 < f_3/f < 17 \tag{3}$$

$$\left. \begin{array}{l} 1.62 < n_1 < 1.7 \\ 55 < \nu_1 < 63 \end{array} \right\} \tag{4}$$

$$\left. \begin{array}{l} 1.7 < n_2 < 1.75 \\ \nu_2 < 30 \end{array} \right\} \tag{5}$$

where
$f$: combined focal length of the entire system
$f_i$: focal length of the $i^{th}$ lens
$f_{1,2}$: combined focal length of a first and second lenses
$d_i$: axial spacing between the $i^{th}$ surface and the $(i+1)^{th}$ surface
$n_i$: refractive index of the $i^{th}$ lens
$\nu_i$: Abbe's number of the $i^{th}$ lens The merits of the topogon type which is a conventional wide field angle objective is succeeded by the lens system of the present invention, and for compensating for demerits thereof, the positive meniscus lenses (the third and fourth lenses) with concave surfaces directed toward the object field and image field, respectively, are added to the diaphragm space to render possible chromatic correction of the tangential image surface at wide angle, and to make it possible to shorten the overall length of the lens system by about 0.1f as compared with the topogon type.

The condition (1) is provided to determine the flatness of the image surface. When the value exceeds the upper limit, the image surface is over and it cannot be corrected by other parameters and usable field angle becomes small. When the value is less than the lower limit, the image surface is under to fail to obtain a balance between the neighborhood of the axial portion and the maximum field angle, as a consequence of which astigmatic difference in the vicinity of the axial portion increases and the usable field angle likewise decreases.

In the condition (2), when the value exceeds the upper limit, spherical aberration is under, and the performance in the vicinity of the axial portion at the time of enlargement of image deteriorates. When the value is less than the lower limit, the spherical aberration is over, and the image surface is over in the tangential rays, failing to obtain a balance between the maximum field angle and the portion in the vicinity of the axial portion, as a consequence of which the usable field angle decreases.

The condition (3) is provided to correct color of the image surface at the wide field angle and the curve of the radial image surface. When the value exceeds the upper limit, the curve of the radial image surface may be corrected but color of the image surface cannot be corrected, as a consequence of which tangential MTF at the wide field angle decreases. When the value is less than the lower limit, the color of the image surface may be corrected but the curve of the radial image surface occurs, as a consequence of which an imbalance occurs between the radial image surface at the wide field angle and the axial portion, and the usable field angle decreases.

The conditions (4) and (5) are provided to correct chromatic aberration of the axial portion and chromatic aberration of the image surface. In the condition (4), when the value is less than the lower limit, color of the image surface at the wide field angle in short wavelength occurs and the tangential MTF decreases. When the value exceeds the upper limit, axial chromatic aberration occurs, and the axial MTF decreases, and greatly decreases particularly at the time of enlargement of image.

In the condition (5) with the condition (4), when the value exceeds the upper limit or is less than the lower limit, the axial chromatic aberration and the chromatic aberration of the image surface occur in any case, and the color of the image surface cannot be corrected even by the condition (3).

BRIEF DESCRIPTION OF THE DRAWINGS

FIGS. 5, 6 and 7 show various aberrations and MTF at an enlargement ($\times 2.0$) in Embodiment 1;

FIGS. 23, 24 and 25 show various aberrations and MTF at an enlargement ($\times 2.0$) in Embodiment 3;

DETAILED DESCRIPTION OF THE PREFERRED EMBODIMENTS

Figure 1:
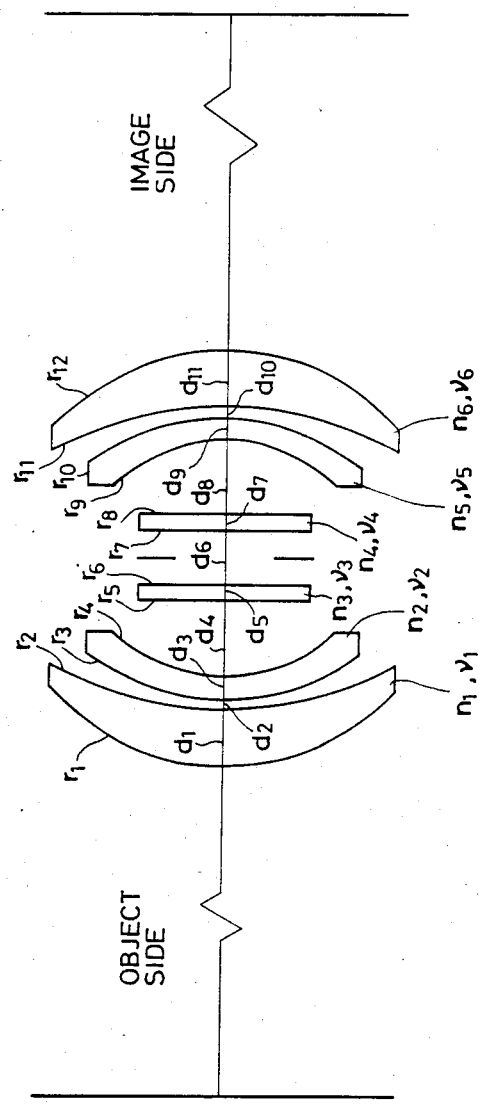
FIG. 1 is a sectional view of a lens system in accordance with the present invention.

In the following, embodiments of the present invention are given.

Symbols in Tables other than those shown in the aforementioned conditional formulae include:

$F_{NO}$: brightness of lens system,
$\omega$: half field andle,
m: magnification,
Y: height of image.

| Embodiment 1 | | | | | | | |
|---|---|---|---|---|---|---|---|
| $f = 100.0084$ $\omega = 34°$ | | | $F_{NO} = 10$ $Y = 133$ | | $m = \times 0.5 - \times 2.0$ | | |
| $r_1$ | 18.911 | $d_1$ | 4.621 | $n_1$ | 1.64 | $\nu_1$ | 60.1 |
| $r_2$ | 31.777 | $d_2$ | 0.774 | | | | |
| $r_3$ | 17.953 | $d_3$ | 1.77 | $n_2$ | 1.72825 | $\nu_2$ | 28.5 |
| $r_4$ | 13.307 | $d_4$ | 6.203 | | | | |
| $r_5$ | −345.342 | $d_5$ | 1.468 | $n_3$ | 1.49831 | $\nu_3$ | 65.0 |
| $r_6$ | −243.116 | $d_6$ | 4.024 | | | | |
| $r_7 = -r_6$ | 243.116 | $d_7 = d_5$ | 1.468 | $n_4 = n_3$ | 1.49831 | $\nu_4 = \nu_3$ | 65.0 |
| $r_8 = -r_5$ | 345.342 | $d_8 = d_4$ | 6.203 | | | | |
| $r_9 = -r_4$ | −13.307 | $d_9 = d_3$ | 1.77 | $n_5 = n_2$ | 1.72825 | $\nu_5 = \nu_2$ | 28.5 |
| $r_{10} = -r_3$ | −17.953 | $d_{10} = d_2$ | 0.774 | | | | |
| $r_{11} = -r_2$ | −31.777 | $d_{11} = d_1$ | 4.621 | $n_6 = n_1$ | 1.64 | $\nu_6 = \nu_1$ | 60.1 |
| $r_{12} = -r_1$ | −18.911 | | | | | | |

$$\frac{f_{1,2}}{f_1} = 2.6538 \qquad \frac{d_1 + d_2 + d_3}{f} = 0.0716$$

$$\frac{f_3}{f} = 16.4020 \qquad n_1 = 1.64$$

-continued

Embodiment 1

| | | |
|---|---|---|
| $n_2 = 1.72825$ | | $\nu_1 = 60.1$ |
| $\nu_2 = 28.5$ | | |

Embodiment 2

| $f = 100.0158$ | | $F_{NO} = 10$ | | | $m = \times 0.5 - \times 2.0$ | |
|---|---|---|---|---|---|---|
| $\omega = 34°$ | | $Y = 133$ | | | | |
| $r_1$ | 18.747 | $d_1$ | 4.618 | $n_1$ | 1.63854 $\nu_1$ | 55.4 |
| $r_2$ | 31.562 | $d_2$ | 0.774 | | | |
| $r_3$ | 17.913 | $d_3$ | 1.767 | $n_2$ | 1.74077 $\nu_2$ | 27.8 |
| $r_4$ | 13.282 | $d_4$ | 6.156 | | | |
| $r_5$ | −344.953 | $d_5$ | 1.468 | $n_3$ | 1.49831 $\nu_3$ | 65.0 |
| $r_6$ | −242.842 | $d_6$ | 4.024 | | | |
| $r_7 = -r_6$ | 242.842 | $d_7 = d_5$ | 1.468 | $n_4 = n_3$ | 1.49831 $\nu_4 = \nu_3$ | 65.0 |
| $r_8 = -r_5$ | 344.953 | $d_8 = d_4$ | 6.156 | | | |
| $r_9 = -r_4$ | −13.282 | $d_9 = d_3$ | 1.767 | $n_5 = n_2$ | 1.74077 $\nu_5 = \nu_2$ | 27.8 |
| $r_{10} = -r_3$ | −17.913 | $d_{10} = d_2$ | 0.774 | | | |
| $r_{11} = -r_2$ | −31.562 | $d_{11} = d_1$ | 4.618 | $n_6 = n_1$ | 1.63854 $\nu_6 = \nu_1$ | 55.4 |
| $r_{12} = -r_1$ | −18.747 | | | | | |

$$\frac{f_{1.2}}{f_1} = 2.6759 \qquad \frac{d_1 + d_2 + d_3}{f} = 0.0716$$

$$\frac{f_3}{f} = 16.3822 \qquad n_1 = 1.63854$$

$n_2 = 1.74077 \qquad \nu_1 = 55.4$
$\nu_2 = 27.8$

Embodiment 3

| $f = 99.9753$ | | $F_{NO} = 10$ | | | $m = \times 0.5 - \times 2.0$ | |
|---|---|---|---|---|---|---|
| $\omega = 34°$ | | $Y = 133$ | | | | |
| $r_1$ | 19.101 | $d_1$ | 4.858 | $n_1$ | 1.64 $\nu_1$ | 60.1 |
| $r_2$ | 31.492 | $d_2$ | 0.245 | | | |
| $r_3$ | 18.009 | $d_3$ | 1.759 | $n_2$ | 1.72825 $\nu_2$ | 28.5 |
| $r_4$ | 13.455 | $d_4$ | 6.315 | | | |
| $r_5$ | −351.554 | $d_5$ | 1.4 | $n_3$ | 1.49831 $\nu_3$ | 65.0 |
| $r_6$ | −233.683 | $d_6$ | 4.286 | | | |
| $r_7 = -r_6$ | 233.683 | $d_7 = d_5$ | 1.4 | $n_4 = n_3$ | 1.49831 $\nu_4 = \nu_3$ | 65.0 |
| $r_8 = -r_5$ | 351.554 | $d_8 = d_4$ | 6.315 | | | |
| $r_9 = -r_4$ | −13.455 | $d_9 = d_3$ | 1.759 | $n_5 = n_2$ | 1.72825 $\nu_5 = \nu_2$ | 28.5 |
| $r_{10} = -r_3$ | −18.009 | $d_{10} = d_2$ | 0.245 | | | |
| $r_{11} = -r_2$ | −31.492 | $d_{11} = d_1$ | 4.858 | $n_6 = n_1$ | 1.64 $\nu_6 = \nu_1$ | 60.1 |
| $r_{12} = -r_1$ | −19.101 | | | | | |

$$\frac{f_{1.2}}{f_1} = 2.6395 \qquad \frac{d_1 + d_2 + d_3}{f} = 0.0686$$

$$\frac{f_3}{f} = 13.9350 \qquad n_1 = 1.64$$

$n_2 = 1.72825 \qquad \nu_1 = 60.1$
$\nu_2 = 28.5$

Embodiment 4

| $f = 100.0304$ | | $F_{NO} = 8$ | | | $m = \times 0.5 - \times 2.0$ | |
|---|---|---|---|---|---|---|
| $\omega = 30°$ | | $Y = 115$ | | | | |
| $r_1$ | 19.610 | $d_1$ | 5.016 | $n_1$ | 1.64 $\nu_1$ | 60.1 |
| $r_2$ | 31.987 | $d_2$ | 0.432 | | | |
| $r_3$ | 18.058 | $d_3$ | 1.816 | $n_2$ | 1.72825 $\nu_2$ | 28.5 |
| $r_4$ | 13.622 | $d_4$ | 6.27 | | | |
| $r_5$ | −349.130 | $d_5$ | 1.6 | $n_3$ | 1.49831 $\nu_3$ | 65.0 |
| $r_6$ | −224.809 | $d_6$ | 4.254 | | | |
| $r_7 = -r_6$ | 224.809 | $d_7 = d_5$ | 1.6 | $n_4 = n_3$ | 1.49831 $\nu_4 = \nu_3$ | 65.0 |
| $r_8 = -r_5$ | 349.130 | $d_8 = d_4$ | 6.27 | | | |
| $r_9 = -r_4$ | −13.622 | $d_9 = d_3$ | 1.816 | $n_5 = n_2$ | 1.72825 $\nu_5 = \nu_2$ | 28.5 |
| $r_{10} = -r_3$ | −18.058 | $d_{10} = d_2$ | 0.432 | | | |
| $r_{11} = -r_2$ | −31.987 | $d_{11} = d_1$ | 5.016 | $n_6 = n_1$ | 1.64 $\nu_6 = \nu_1$ | 60.1 |
| $r_{12} = -r_1$ | −19.610 | | | | | |

-continued

Embodiment 4

$\dfrac{f_{1,2}}{f_1} = 2.5511$     $\dfrac{d_1 + d_2 + d_3}{f} = 0.0726$ $\dfrac{f_3}{f} = 12.6116$     $n_1 = 1.64$ $n_2 = 1.72825$     $v_1 = 60.1$
$v_2 = 28.5$ As described above, the present invention provides a new copying lens system in which a third lens and a fourth lens are introduced with a diaphragm placed therebetween whereby chromatic correction of the tangential image surface may be made at the wide field angle while maintaining the merits of the topogon type.

Figures 2, 3, 4:
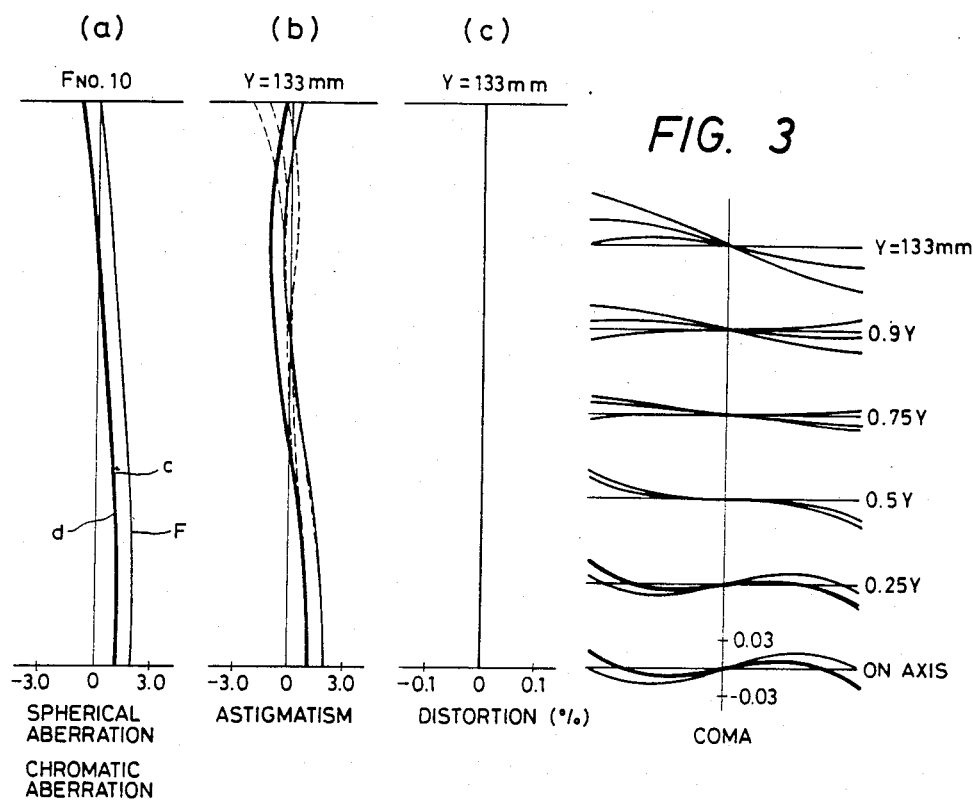
FIGS. 2, 3 and 4 show various aberrations and MTF at the unit magnification in Embodiment 1.
Figure 8:
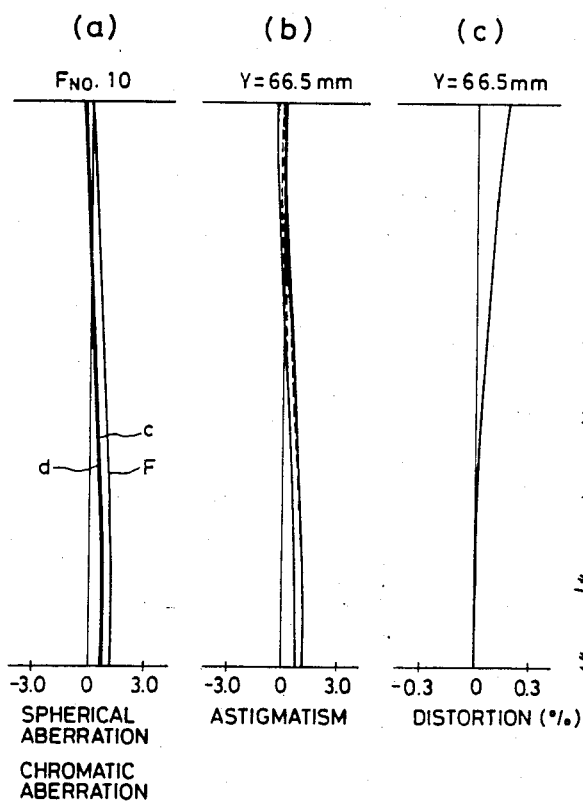
FIGS. 8, 9 and 10 show various aberrations and MTF at reduction ($\times 0.5$) in Embodiment 1.
Figure 9:
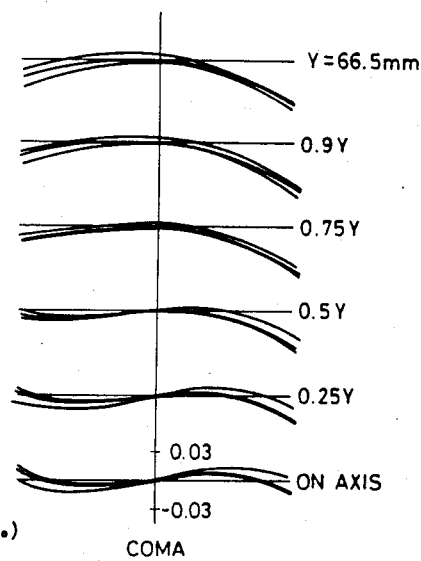
Figure 10:
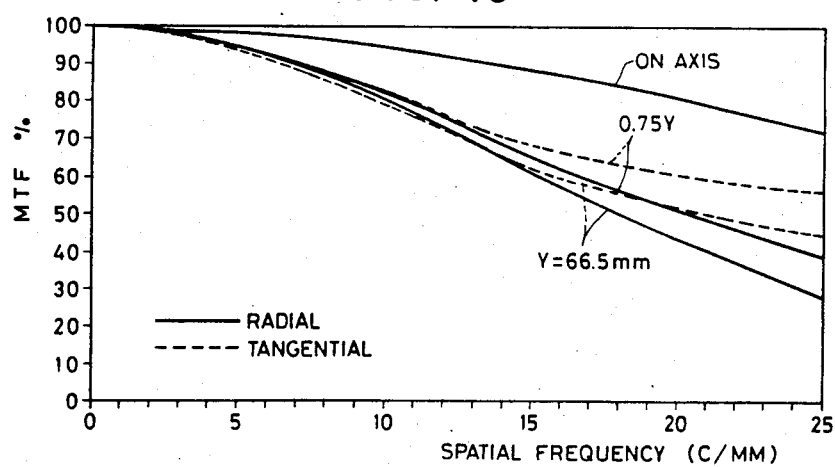
Figure 11:
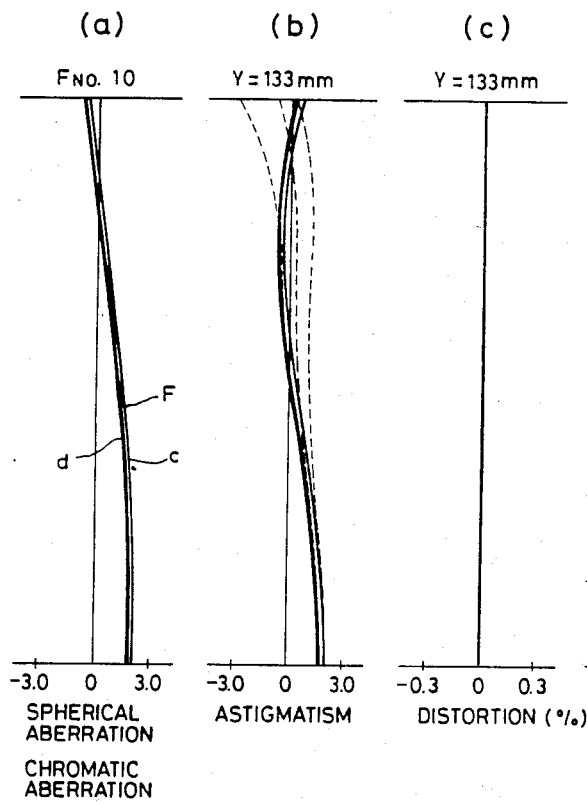
FIGS. 11, 12 and 13 show various aberrations and MTF at the unit magnification in Embodiment 2.
Figure 12:
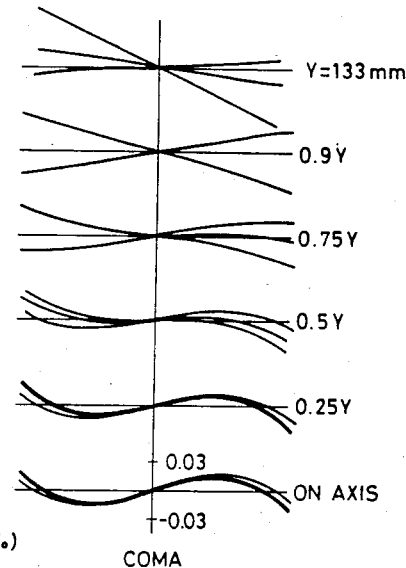
Figure 13:
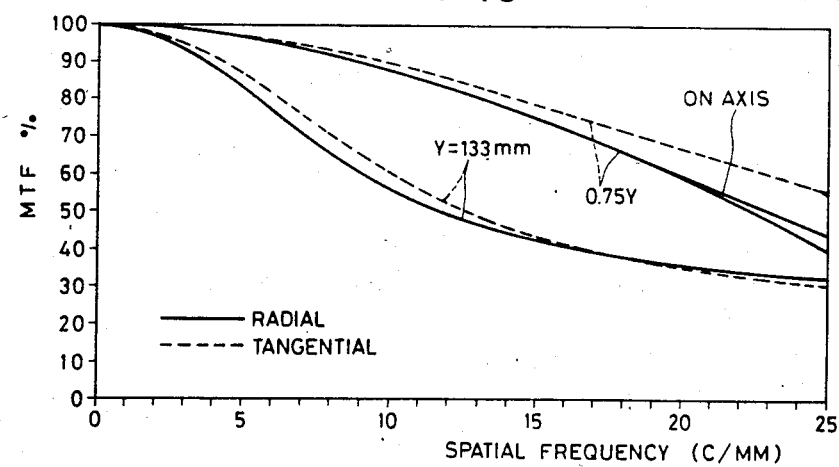
Figure 14:
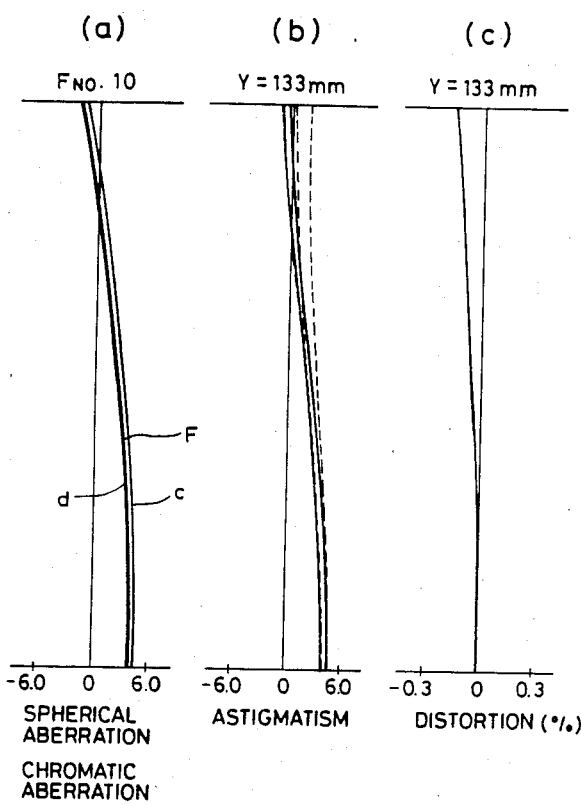
FIGS. 14, 15 and 16 show various aberrations and MTF at an enlargement ($\times 2.0$) in Embodiment 2.
Figure 15:
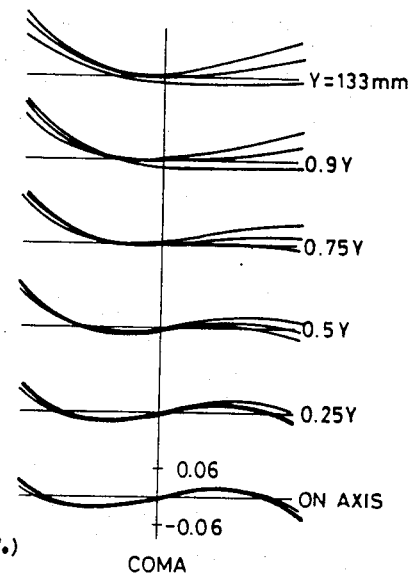
Figure 16:
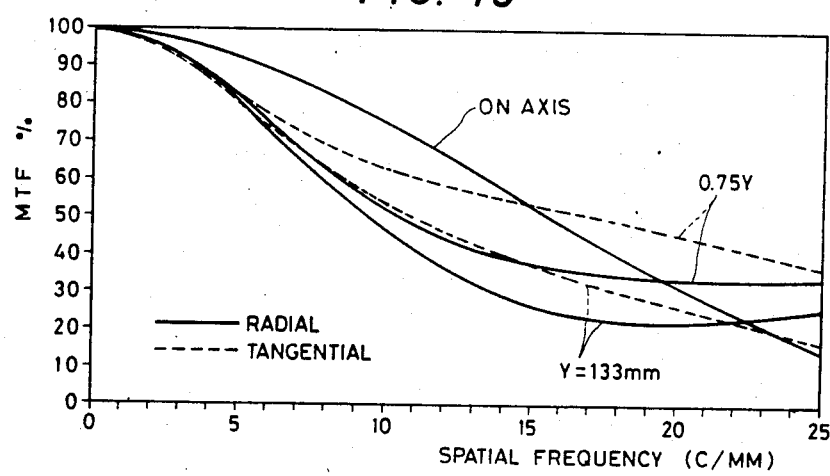
Figure 17:
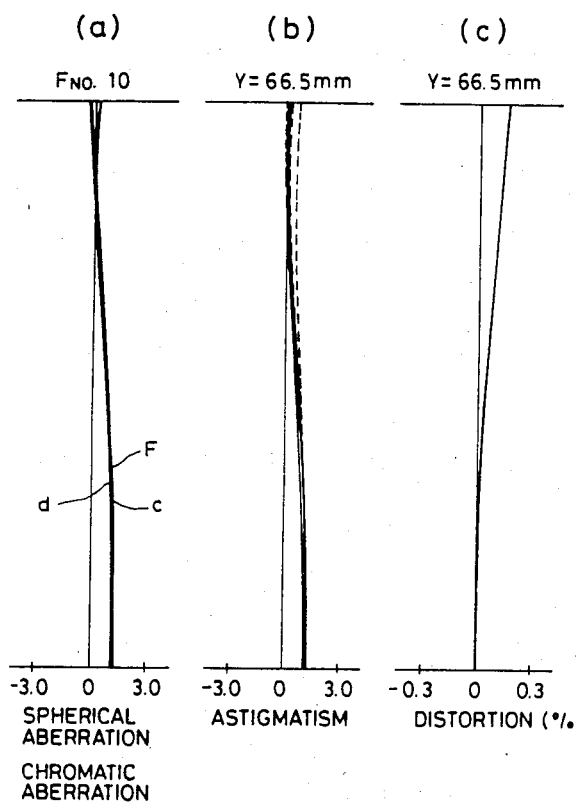
FIGS. 17, 18 and 19 show various aberrations and MTF at a reduction ($\times 0.5$) in Embodiment 2.
Figure 18:
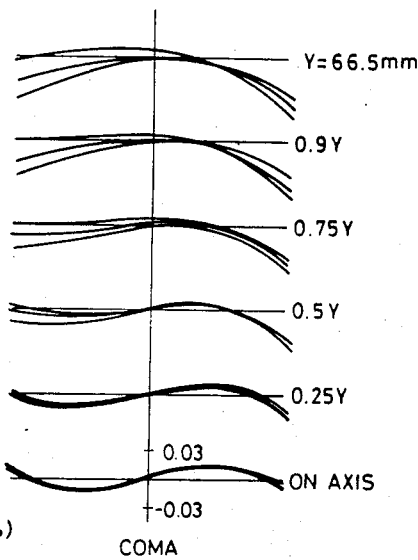
Figure 19:
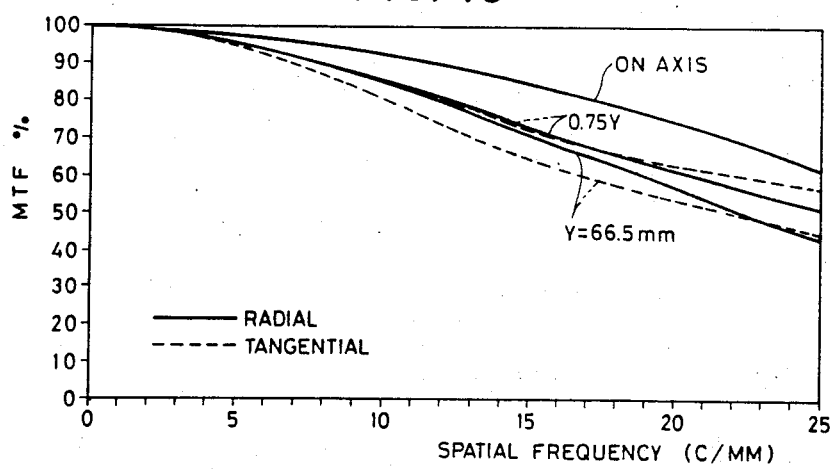
Figure 20:
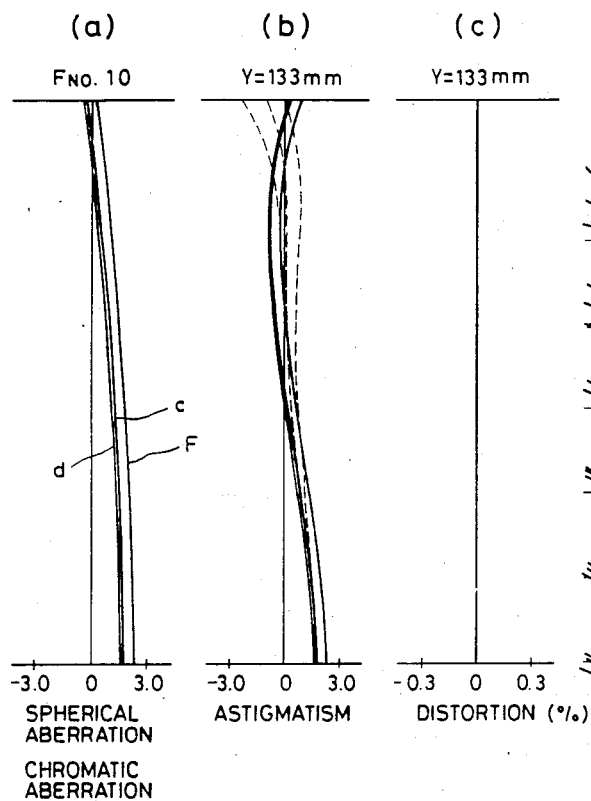
FIGS. 20, 21 and 22 show various aberrations and MTF at the unit magnification in Embodiment 3.
Figure 21:
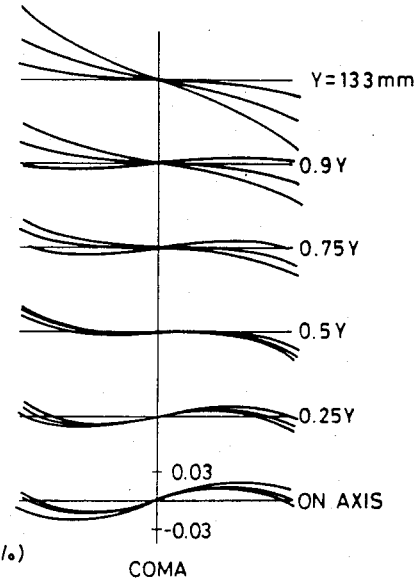
Figure 22:
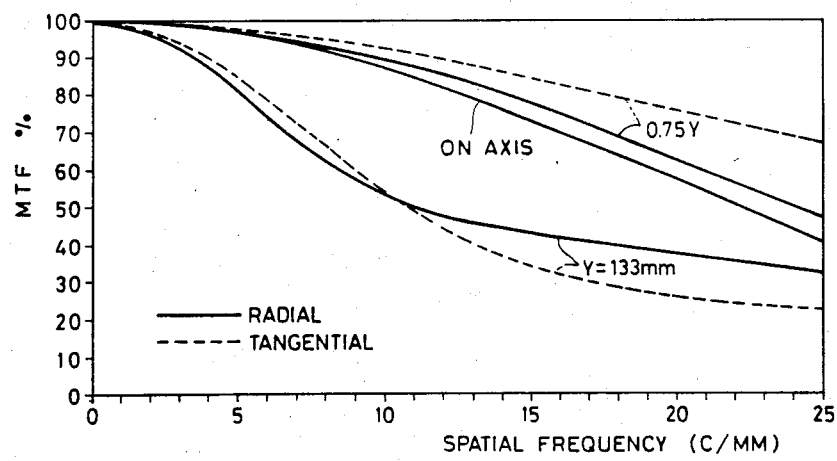
Figure 26:
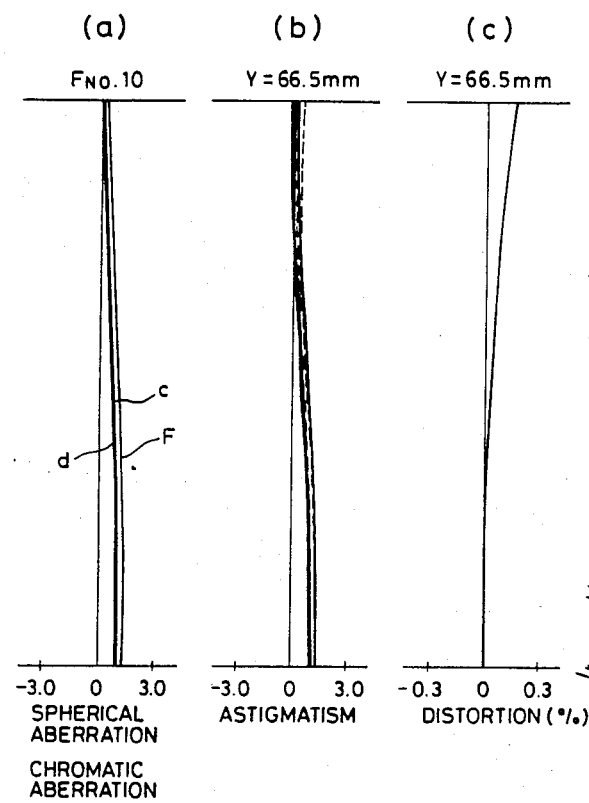
FIGS. 26, 27 and 28 show various aberrations and MTF at a reduction ($\times 0.5$) in Embodiment 3.
Figure 27:
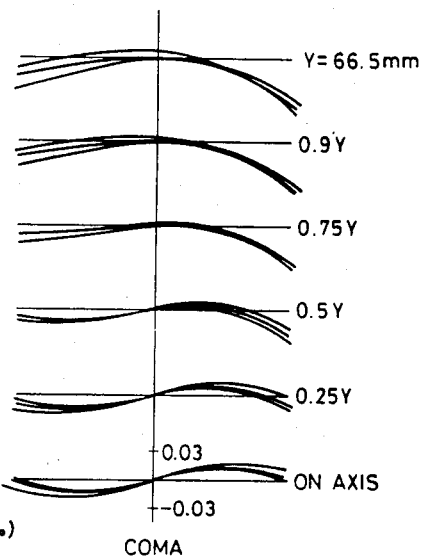
Figure 28:
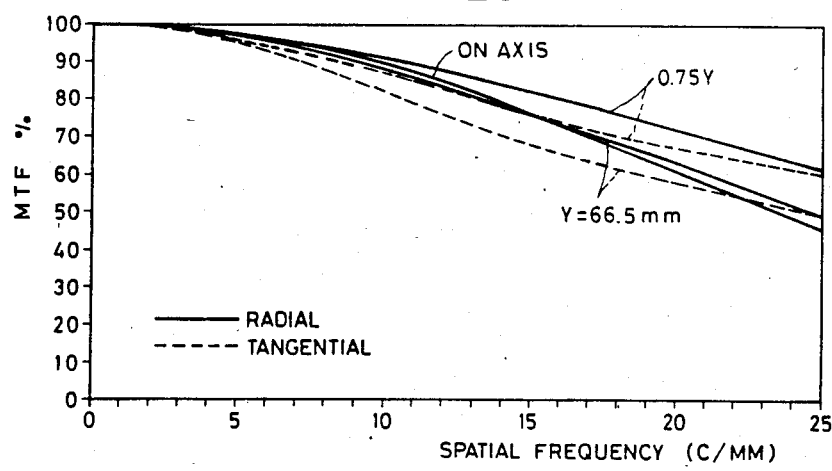
Figure 29:
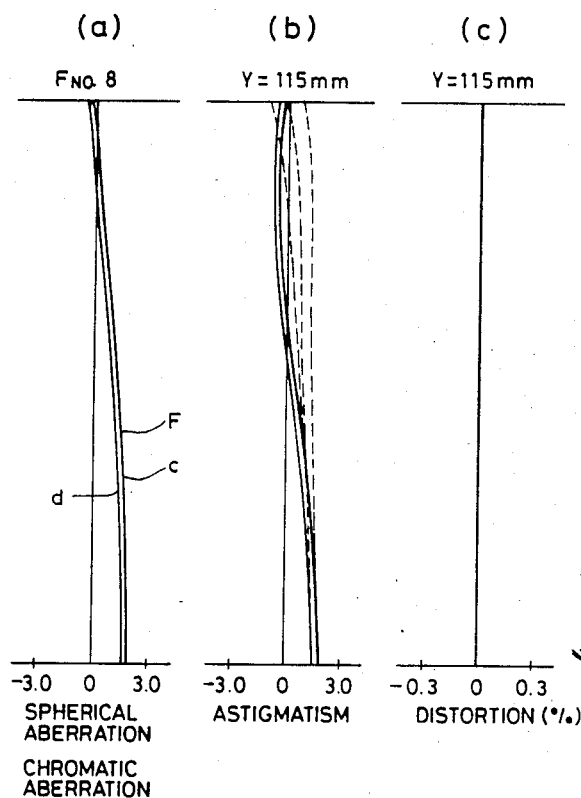
FIGS. 29, 30 and 31 show various aberrations and MTF at the unit magnification in Embodiment 4.
Figure 30:
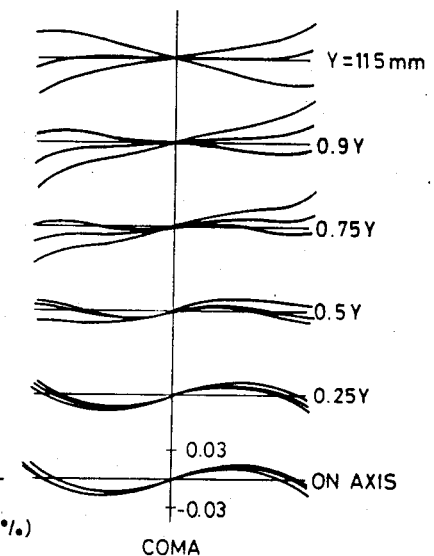
Figure 31:
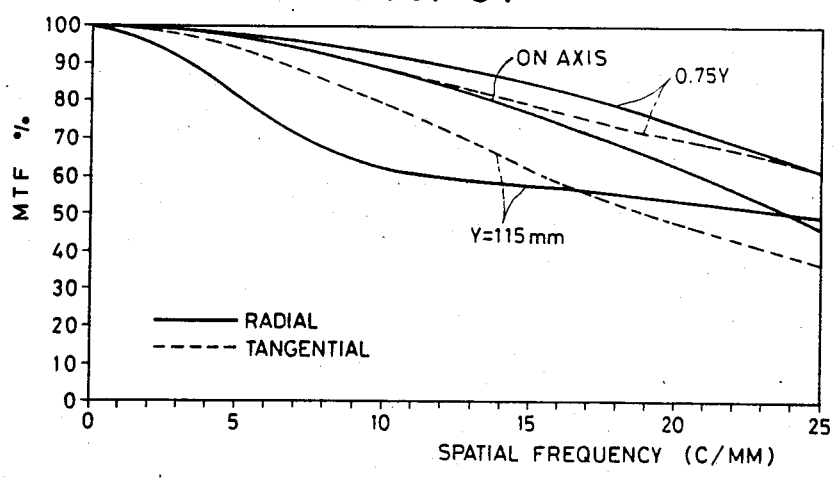
Figure 32:
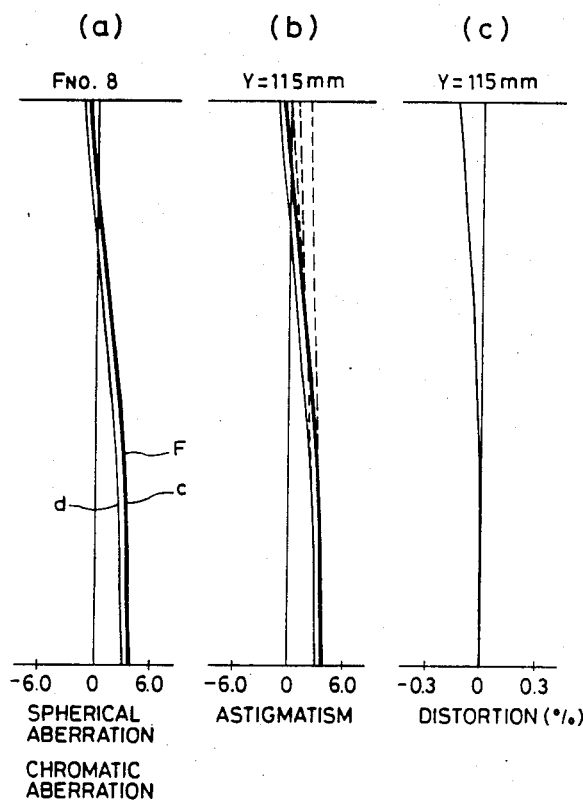
FIGS. 32, 33 and 34 show various aberrations and MTF at an enlargement ($\times 2.0$) in Embodiment 4.
Figure 33:
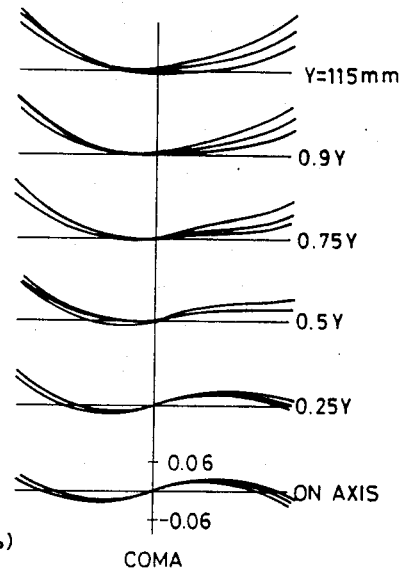
Figure 34:
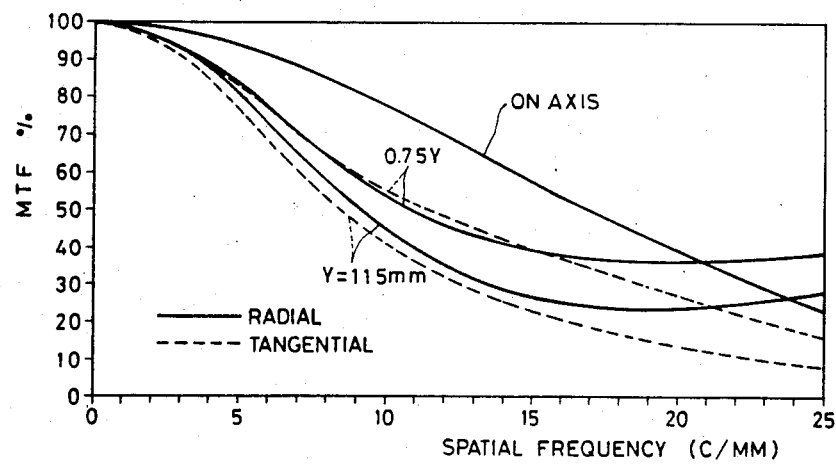
Figure 35:
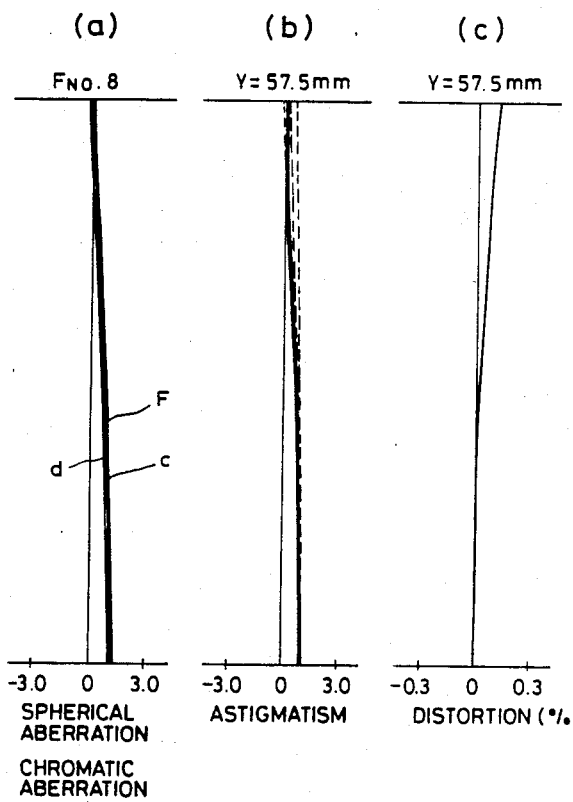
FIGS. 35, 36 and 37 show various aberrations and MTF at a reduction ($\times 0.5$) in Embodiment 4.
Figure 36:
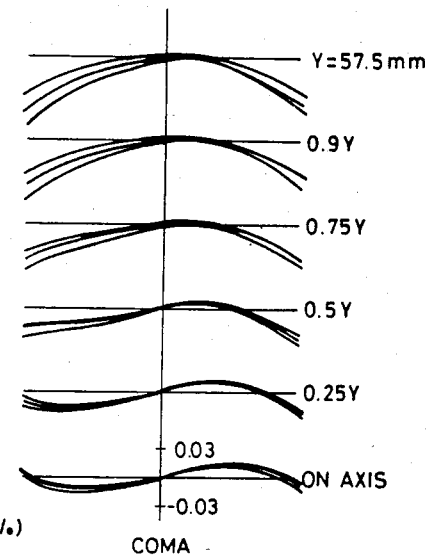
Figure 37:
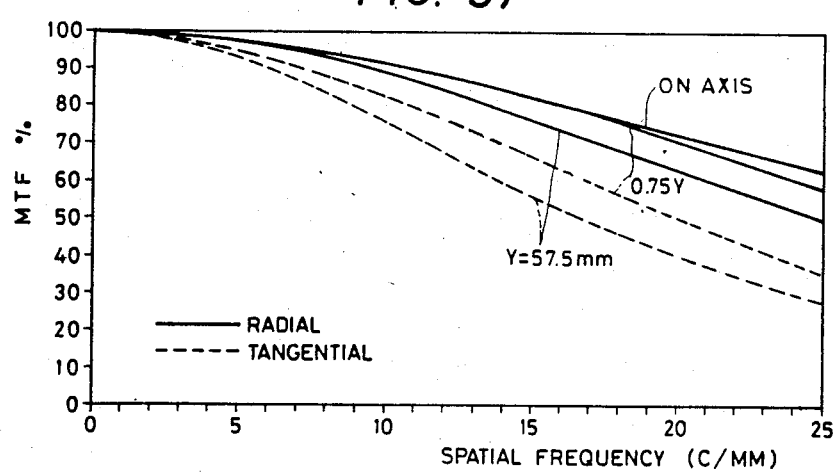

Various aberrations and MTF in variation zones of from ×0.5 to ×2.0 are as shown in FIGS. 2 through 37, and they are well corrected from the center of the image plane to the marginal portion, and MTF also has the excellent performance up to the high frequency. In addition, the overall length of the lens system is shorter, by approximately 0.1f, than that of the topogon type, thus achieving miniaturization of the entire optical system.

What is claimed is:

1. A wide angle copying lens system comprising a completely symmetrical arrangement of six units in the form of six lenses which consists of, in order from the object field side, a first lens in the form of a positive meniscus with the convex surface directed toward the object field, a second lens in the form of a negative meniscus with the convex surface directed toward the object field, a third lens in the form of a positive meniscus with the concave surface directed toward the object field, a diaphragm, a fourth lens in the form of a positive meniscus with the concave surface directed toward the image field in and of the same configuration as that of the third lens with the diaphragm placed therebetween, a fifth lens in the form of a negative meniscus with the convex surface directed toward the image field and of the same configuration as that of the second lens, and, a sixth lens in the form of a positive meniscus with the convex surface directed toward the image field and of the same configuration as that of the first lens, the lens system satisfying the following conditions:

$$2.4 < f_{1,2}/f_1 < 2.8$$

$$0.065 < \dfrac{d_1 + d_2 + d_3}{f} < 0.075$$

$$11 < f_3/f < 17$$
$$1.62 < n_1 < 1.7$$
$$55 < v_1 < 63$$
$$1.7 < n_2 < 1.75$$
$$v_2 < 30$$

where
   f: combined focal length of the entire system
   $f_i$: focal length of the $i^{th}$ lens
   $f_{1,2}$: combined focal length of a first and second lenses
   $d_i$: axial spacing between the $i^{th}$ surface and the $(i=1)^{th}$ surface
   $n_i$: refractive index of the $i^{th}$ lens
   $v_i$: Abbe's number of the $i^{th}$ lens.

2. The copying lens system according to claim 1, wherein the lens system is expressed by the following data:

| f = 100.0084    $F_{NO}$ = 10 | | | | | | | |
|---|---|---|---|---|---|---|---|
| $r_1$ | 18.911 | $d_1$ | 4.621 | $n_1$ | 1.64 | $v_1$ | 60.1 |
| $r_2$ | 31.777 | $d_2$ | 0.774 | | | | |
| $r_3$ | 17.953 | $d_3$ | 1.77 | $n_2$ | 1.72825 | $v_2$ | 28.5 |
| $r_4$ | 13.307 | $d_4$ | 6.203 | | | | |
| $r_5$ | −345.342 | $d_5$ | 1.468 | $n_3$ | 1.49831 | $v_3$ | 65.0 |
| $r_6$ | −243.116 | $d_6$ | 4.024 | | | | |
| $r_7 = -r_6$ | 243.116 | $d_7 = d_5$ | 1.468 | $n_4 = n_3$ | 1.49831 | $v_4 = v_3$ | 65.0 |
| $r_8 = -r_5$ | 345.342 | $d_8 = d_4$ | 6.203 | | | | |
| $r_9 = -r_4$ | −13.307 | $d_9 = d_3$ | 1.77 | $n_5 = n_2$ | 1.72825 | $v_5 = v_2$ | 28.5 |
| $r_{10} = -r_3$ | −17.953 | $d_{10} = d_2$ | 0.774 | | | | |
| $r_{11} = -r_2$ | −31.777 | $d_{11} = d_1$ | 4.621 | $n_6 = n_1$ | 1.64 | $v_6 = v_1$ | 60.1 |
| $r_{12} = -r_1$ | −18.911 | | | | | | | in the table, $r_i$ represents the radius of curvature of the $i^{th}$ refracting surface, in addition to symbols defined in claim 1.

3. The copying lens system according to claim 1, wherein the lens system is expressed by the following data:

| f = 100.0158    $F_{NO}$ = 10 | | | | | | | |
|---|---|---|---|---|---|---|---|
| $r_1$ | 18.747 | $d_1$ | 4.618 | $n_1$ | 1.63854 | $v_1$ | 55.4 |
| $r_2$ | 31.562 | $d_2$ | 0.774 | | | | |
| $r_3$ | 17.913 | $d_3$ | 1.767 | $n_2$ | 1.74077 | $v_2$ | 27.8 |
| $r_4$ | 13.282 | $d_4$ | 6.156 | | | | |
| $r_5$ | −344.953 | $d_5$ | 1.468 | $n_3$ | 1.49831 | $v_3$ | 65.0 |
| $r_6$ | −242.842 | $d_6$ | 4.024 | | | | |
| $r_7 = -r_6$ | 242.842 | $d_7 = d_5$ | 1.468 | $n_4 = n_3$ | 1.49831 | $v_4 = v_3$ | 65.0 |
| $r_8 = -r_5$ | 344.953 | $d_8 = d_4$ | 6.156 | | | | |
| $r_9 = -r_4$ | −13.282 | $d_9 = d_3$ | 1.767 | $n_5 = n_2$ | 1.74077 | $v_5 = v_2$ | 27.8 |

-continued

| | f = 100.0158   F$_{NO}$ = 10 | | | | | | |
|---|---|---|---|---|---|---|---|
| $r_{10} = -r_3$ | −17.913 | $d_{10} = d_2$ | 0.774 | | | | |
| $r_{11} = -r_2$ | −31.562 | $d_{11} = d_1$ | 4.618 | $n_6 = n_1$ | 1.63854 | $v_6 = v_1$ | 55.4 |
| $r_{12} = -r_1$ | −18.747 | | | | | | |

4. The copying lens system according to claim 1, wherein the lens system is expressed by the following data:

| | f = 99.9753   F$_{NO}$ = 10 | | | | | |
|---|---|---|---|---|---|---|
| $r_1$ | 19.101 | $d_1$ | 4.858 | $n_1$ | 1.64 | $v_1$ | 60.1 |
| $r_2$ | 31.492 | $d_2$ | 0.245 | | | |
| $r_3$ | 18.009 | $d_3$ | 1.759 | $n_2$ | 1.72825 | $v_2$ | 28.5 |
| $r_4$ | 13.455 | $d_4$ | 6.315 | | | |
| $r_5$ | −351.554 | $d_5$ | 1.4 | $n_3$ | 1.49831 | $v_3$ | 65.0 |
| $r_6$ | −233.683 | $d_6$ | 4.286 | | | |
| $r_7 = -r_6$ | 233.683 | $d_7 = d_5$ | 1.4 | $n_4 = n_3$ | 1.49831 | $v_4 = v_3$ | 65.0 |
| $r_8 = -r_5$ | 351.554 | $d_8 = d_4$ | 6.315 | | | |
| $r_9 = -r_4$ | −13.455 | $d_9 = d_3$ | 1.759 | $n_5 = n_2$ | 1.72825 | $v_5 = v_2$ | 28.5 |
| $r_{10} = -r_3$ | −18.009 | $d_{10} = d_2$ | 0.245 | | | |
| $r_{11} = -r_2$ | −31.492 | $d_{11} = d_1$ | 4.858 | $n_6 = n_1$ | 1.64 | $v_6 = v_1$ | 60.1 |
| $r_{12} = -r_1$ | −19.101 | | | | | |

5. The copying lens system according to claim 1, wherein the lens system is expressed by the following data:

| | f = 100.0304   F$_{NO}$ = 8 | | | | | |
|---|---|---|---|---|---|---|
| $r_1$ | 19.610 | $d_1$ | 5.016 | $n_1$ | 1.64 | $v_1$ | 60.1 |
| $r_2$ | 31.987 | $d_2$ | 0.432 | | | |
| $r_3$ | 18.058 | $d_3$ | 1.816 | $n_2$ | 1.72825 | $v_2$ | 28.5 |
| $r_4$ | 13.622 | $d_4$ | 6.27 | | | |
| $r_5$ | −349.130 | $d_5$ | 1.6 | $n_3$ | 1.49831 | $v_3$ | 65.0 |
| $r_6$ | −224.809 | $d_6$ | 4.254 | | | |
| $r_7 = -r_6$ | 224.809 | $d_7 = d_5$ | 1.6 | $n_4 = n_3$ | 1.49831 | $v_4 = v_3$ | 65.0 |
| $r_8 = -r_5$ | 349.130 | $d_8 = d_4$ | 6.27 | | | |
| $r_9 = -r_4$ | −13.622 | $d_9 = d_3$ | 1.816 | $n_5 = n_2$ | 1.72825 | $v_5 = v_2$ | 28.5 |
| $r_{10} = -r_3$ | −18.058 | $d_{10} = d_2$ | 0.432 | | | |
| $r_{11} = -r_2$ | −31.987 | $d_{11} = d_1$ | 5.016 | $n_6 = n_1$ | 1.64 | $v_6 = v_1$ | 60.1 |
| $r_{12} = -r_1$ | −19.610 | | | | | |

* * * * *